United States Patent
Castaing et al.

(10) Patent No.: US 6,212,940 B1
(45) Date of Patent: Apr. 10, 2001

(54) ACCELEROMETER SENSOR FOR DETECTING KNOCKS AND METHOD FOR MAKING SAME

(75) Inventors: Jean-Christophe Castaing, Toulouse; Patrick Michel Barrabes, Balma; Jean-Marc Bruyere, Fontenilles, all of (FR)

(73) Assignee: Siemens Automotive S.A., Toulouse Cedex (FR)

( * ) Notice: Subject to any disclaimer, the term of this patent is extended or adjusted under 35 U.S.C. 154(b) by 0 days.

(21) Appl. No.: 09/367,511

(22) PCT Filed: Jan. 26, 1998

(86) PCT No.: PCT/EP98/00424

§ 371 Date: Aug. 13, 1999

§ 102(e) Date: Aug. 13, 1999

(87) PCT Pub. No.: WO98/36280

PCT Pub. Date: Aug. 20, 1998

(30) Foreign Application Priority Data

Feb. 13, 1997 (FR) .................................................. 97 01677

(51) Int. Cl.⁷ .......................... G01L 23/22; H01L 41/04; H01L 41/08; H01L 41/18
(52) U.S. Cl. ........................................... 73/35.11; 310/338
(58) Field of Search ............................. 73/35.11; 310/338

(56) References Cited

U.S. PATENT DOCUMENTS

| | | | |
|---|---|---|---|
| 4,447,755 | 5/1984 | Ghiurea | 310/29 |
| 5,398,540 * | 3/1995 | Entenmann | 73/35.11 |
| 5,440,933 * | 8/1995 | Brammer | 73/35.11 |
| 5,798,453 * | 8/1998 | Brammer | 73/35.11 |

FOREIGN PATENT DOCUMENTS

| | | |
|---|---|---|
| 19524152C1 | 5/1998 | (DE) . |
| 2548376 | 1/1985 | (FR) . |

* cited by examiner

Primary Examiner—Elvin Enad
Assistant Examiner—Karen Addison
(74) Attorney, Agent, or Firm—Herbert L Lerner; Laurence A. Greenberg; Werner H. Stemer

(57) ABSTRACT

It comprises a) a cylindrical base (1) formed of an axial barrel (2) protruding from an annular shoulder (3), through both of which there passes an axial hole (4), b) a washer (6) made of a piezoelectric material slipped over the barrel, c) means (71, 72) for picking off the electrical voltage there is between two radial faces of said washer, e) an annular mass (9), also slipped over the barrel (2) and e) a retaining means collaborating with the annular shoulder (3) to trap said washer (6) and said mass (9) between them. The retaining means consists of a bulge (17) protruding radially from said barrel (2) and formed of the material of a predetermined portion thereof, deformed under an axial force for crushing said base (1).

6 Claims, 1 Drawing Sheet

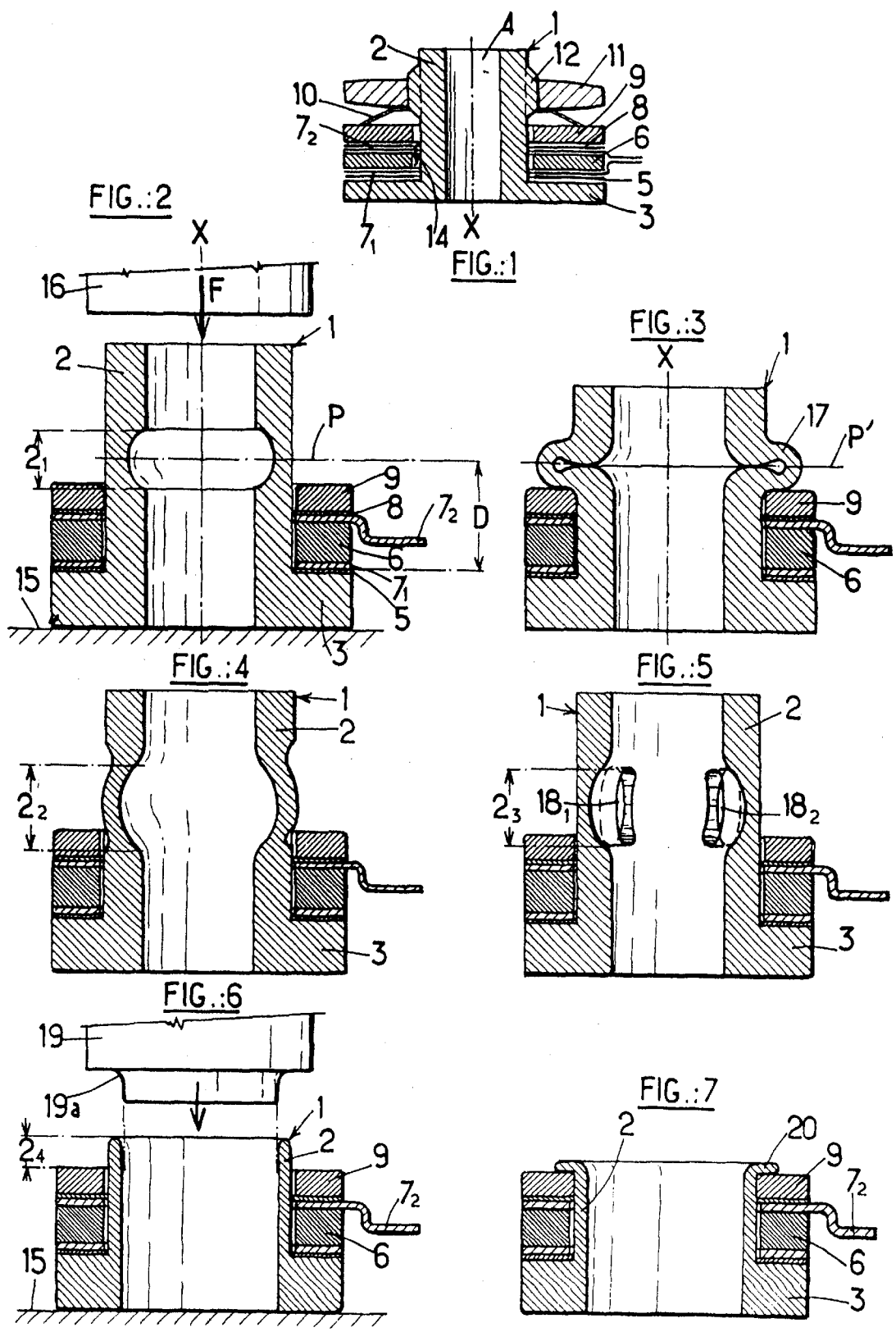

ACCELEROMETER SENSOR FOR DETECTING KNOCKS AND METHOD FOR MAKING SAME

BACKGROUND OF THE INVENTION

1. Field of the Invention

The present invention relates to an accelerometer-type sensor and, more specifically, to a sensor of this kind which is sensitive to the phenomena of pinging liable to affect the operation of an internal combustion engine.

FIG. 1 of the appended drawing is a diagrammatic depiction, in an exploded view, of a known pinging sensor of the prior art, comprising a metallic cylindrical base 1 of axis X formed of an axial barrel 2 protruding from an annular shoulder 3, the barrel and the shoulder both having an axial hole 4 passing through them, the sensor further comprising a number of washers slipped over the barrel 2 and stacked on the shoulder 3. Thus, starting from this shoulder and stacked in this order, there are: a washer 5 made of an electrically insulating material, a washer 6 made of a piezoelectric material and its electrodes $7_1$, $7_2$, each one backing onto one of its axially-separated end faces, a second insulating washer 8, a weighty washer 9, a spring washer 10 and a metal nut 11 screwed onto a screw thread 12 formed on the barrel 2, the nut clamping all of the above listed washers down against the shoulder 3 of the base.

The sensor described above can be fixed to an internal combustion engine using a bolt passed through the axial hole 4. It is known that such a sensor is sensitive to the forces experienced by the engine along the X-axis, such as vibrations due to the pinging phenomenon, and delivers, between the electrodes $7_1$, $7_2$, an electrical signal which represents these forces, the signal being the result of the pressure exerted by the mass 9, accelerated by said forces, on the piezoelectric washer 6. It is also known that when pinging is detected in one cylinder of an internal combustion engine, the computer controlling the operation of the engine reacts by reducing the angle of ignition advance in an attempt to cause this pinging to disappear, as the pinging could otherwise, in the long term, be responsible for mechanical damage to the engine.

The use of a nut to hold the various washers of the sensor on the barrel of the base has numerous drawbacks. On the one hand, the tightening of the nut entails the use of a torque-measuring tightening head to establish a predetermined preload on the piezoelectric washer. When such a sensor is being mass-produced, the preload thus created may vary with wear to the head and with variations to the geometry of the tapped thread of the nut or the screw thread of the barrel, which may, in particular, be corrupted by impacts. Furthermore, swarf may form while the screw thread and/or the tapped thread are being machined. When the sensor is being mounted, swarf 14 thus formed, held in the screw thread of the barrel or in the tapped thread of the nut, may become detached and find its way in between the electrodes $7_1$, $7_2$ of the piezoelectric washer 6, thus short-circuiting these electrodes and making the sensor unusable.

The use of a nut in such a sensor also has the drawbacks of being expensive and of complicating the automating of the assembling of the sensor.

2. Description of the Related Art

There is known, from German Patent No. 195 24 152, a pinging sensor in which the various washers are not retained by a nut but by five lugs formed by punches acting on the exterior of the surface of the metal barrel to tear the material of these lugs from this barrel and upset it outward over the elastic washer 10, whose axial position on the barrel is thus fixed.

This solution does, however, have the following drawbacks. On the one hand, punching of this kind may generate metallic swarf and therefore the short-circuits mentioned earlier. On the other hand, in the context of mass-production, the preload on the piezoelectric washer can vary with variations in the punching forces, which depend on the condition of the cutting edges of the punches, how sharp they are, etc, etc.

SUMMARY OF THE INVENTION

The object of the present invention is to produce an accelerometer-type sensor, in particular a pinging sensor, which is protected against the short-circuiting defects mentioned earlier, and which has accurate setting of the preload applied to the piezoelectric washer, this setting being assured of being very repeatable in mass-production.

Another object of the present invention is to produce a sensor of this kind which is inexpensive to manufacture.

Yet another object of the present invention is to provide a process for manufacturing such a sensor.

These objects of the invention, together with others which will become apparent from reading the following description, are achieved using an accelerometer-type sensor comprising a) a cylindrical base formed of an axial barrel protruding from an annular shoulder, through both of which there passes an axial hole, b) a washer made of a piezoelectric material slipped over the barrel, c) means for picking off the electrical voltage there is between two axially-separated faces of said washer, e) an annular mass, also slipped over the barrel and e) a retaining means collaborating with the annular shoulder to trap said washer and said mass between them. According to the invention, the retaining means consists of a bulge protruding radially from said barrel and formed of the material of a predetermined portion thereof, deformed under an axial force for crushing said base.

As will be seen later on, the formation of this bulge generates no metallic swarf likely to produce a short-circuit in the sensor. Furthermore, the position of this bulge can be determined precisely, and this allows the preload on the piezoelectric washer to be set precisely.

The present invention also provides a process for manufacturing such a sensor, whereby the piezoelectric washer and the annular mass are stacked up on the shoulder of the base around its barrel, this process being noteworthy in that an axial crushing force capable of causing a radial expansion of a portion of said barrel in the form of a bulge for retaining the stacked parts is applied to the base, between these two ends.

Other features and advantages of the present invention will become apparent from reading the description which will follow and from examining the appended drawing, in which:

BRIEF DESCRIPTION OF THE DRAWINGS:

FIG. 1 is a diagram of a pinging sensor of the prior art, described in the preamble of this description, FIGS. 2 and 3 illustrate the process according to the invention of manufacturing one embodiment of the sensor according to the invention, FIGS. 4 and 5 depict alternative forms of the base of the sensor of FIGS. 2 and 3, and FIGS. 6 and 7 illustrate an alternative form of the manufacturing process illustrated in FIGS. 2 and 3.

DESCRIPTION OF THE PREFERRED EMBODIMENTS:

Reference is made to FIG. 2 of the appended drawing which depicts all of the parts of one embodiment of the sensor according to the invention, prior to the formation of the bulge constituting the retaining means mentioned earlier. In this FIG. and the subsequent FIGS., numerical references which are identical to those used in FIG. 1 depict components or elements which are identical or similar.

Thus, FIG. 2 again shows the base 1, its barrel 2 and its shoulder 3, the insulating washers 5 and 8, the piezoelectric washer 6 and its electrodes $7_1$, $7_2$ and the mass 9. Note the absence of the spring washer 10, although its presence is optional, as will be seen later.

FIG. 2 depicts the sensor according to the invention, in the stage of its manufacture which immediately precedes the formation of the returning means needed for assembling the various washers stacked up on the shoulder 3 of the barrel 1. The latter therefore has an exterior surface which is roughly cylindrical of revolution.

According to the present invention, a portion $2_1$ of this barrel is internally hollowed out to locally thin the wall of the barrel, which has a minimum thickness in a plane P perpendicular to the axis X, the distance D from this plane P to the shoulder 3 being predetermined and fixed precisely for a reason explained below. As a preference, the plane P constitutes a plane of symmetry of the portion $2_1$.

To manufacture the sensor according to the invention, the various parts 5, 6, $7_1$, $7_2$, 8 and 9 described above are slipped over the barrel in such a way that they stack up on the shoulder 3 of the base 1. As depicted in FIG. 2, with the base placed on a bearing surface 15, a crushing force F is applied to this base along the axis X using a heading tool 16, for example.

The force F applied is altered to suit the mechanical strength of the barrel 2, preferably made of a metal capable of flowing locally under this force, and to suit the thickness of the barrel in the plane P in which this thickness is at its minimum.

Specifically, this minimum thickness defines, in this plane, a line of weakness of the barrel. By altering the force F applied in such a way that the elastic limit of the metal of the barrel is exceeded, at least in the plane P, and only in the portion $2_1$ of the barrel, it is possible to be sure that this portion will collapse under the applied load. This collapse will bring about radial expansion of the material of the portion, in the form of the bulge 17 depicted in FIG. 3, which roughly depicts the geometry of the finished sensor.

It is clear from FIG. 3 that parts of the portion $2_1$ of the barrel, which lie on each side of the plane P of the line of weakness, come into abutment against each other in a plane P' roughly perpendicular to the axis X. Through an appropriate adjustment of the modulus of the force F and the time for which this force is applied, it will be understood that the position of this plane P' can be adjusted precisely, the aforementioned coming-into-abutment, combined with the fact that the bulge 17 presses against the mass 9, abruptly increasing the strength of the barrel which therefore opposes any additional buckling. The preload in the piezoelectric washer slipped, with the other parts, over the barrel 2 between the shoulder 3 and the bulge 17 is therefore precisely set.

In this respect, it will be noted that this precision can be further enhanced by using the electrical voltage which appears between the electrodes $7_1$, $7_2$ while the force F is being applied, to control the cessation of this force when a predetermined voltage level is reached, this level representing the level of the preload exerted on the piezoelectric washer 6 placed between the shoulder 3 and the bulge 17.

It will furthermore be noted that the formation of the bulge 17 generates no swarf liable subsequently to produce short circuits between the electrodes $7_1$, $7_2$. In the context of mass production, the present invention thus greatly reduces the rate of misshapes, already improved by the good reproducibility with which the preload can be set that can be obtained with the means described above.

FIGS. 4 and 5 depict possible alternative forms of the portion $2_1$ of the barrel of the base, capable of allowing the formation of a bulge when this base is axially crushed. In FIG. 4, the portion $2_2$ has an axial cross section of developing profile which eliminates the sharp corners of that of the portion $2_1$ of FIG. 1, this developing profile being present both on the interior wall and on the exterior wall of the barrel. In FIG. 5, the portion $2_3$ has a straight axial profile on the exterior wall of the barrel and a developing profile on the interior wall, consistent with that of the portion $2_2$ of FIG. 4.

Furthermore, FIG. 5 depicts axial apertures $18_1$, $18_2$, etc., also spread out circumferentially in the portion $2_3$. It will be understood that each of these apertures creates a zone of weakness in the barrel 2 about its central part, which zone allows the portion $2_3$ to collapse under an axial crushing force. It will also be understood that the apertures $18_1$ can be used alone, in a portion of barrel with a wall of constant thickness, or in combination with a wall of developing profile as depicted in FIG. 5, to create the zone of weakness necessary to allow the portion in which they are made to collapse.

It is clear that the bulges created using barrels in accordance with those depicted in FIGS. 2 and 4 have a continuous annular shape, whereas the bulge created with the barrel of FIG. 5 is discontinuous, because of the presence of the apertures.

In FIG. 6, the base 1 depicted comprises a barrel with a wall of constant thickness, exhibiting an end portion 24 which protrudes from the top of the pile of parts slipped over this barrel.

According to the invention, a bulge for retaining the stack of parts 5, 6, $7_1$, $7_2$, 8 and 9 is formed by turning this portion 24 over onto this stack, as depicted in FIG. 7, using a punch 19, which at its end, has an annular groove 19a, the inside diameter of which is slightly smaller that that of the axial hole passing through the base 1. As the punch 19 enters this hole, the portion 24 is gradually upset toward the outside of the hole by the groove 19a of the punch, until the material of this portion is spread out over the mass 9 in the form of a bulge 20 which clinches the parts slipped onto the barrel between itself and the shoulder 3.

It will be noted that this embodiment of the sensor according to the invention is economical because of the simplicity of the geometry of the barrel 2 of the base 1.

Of course, the invention is not restricted to the embodiments described and depicted which have been given merely by way of examples. Thus, the sensors of FIGS. 3 and 7 could be equipped with a spring washer such as the washer 10 of the sensor of FIG. 1, without departing from the scope of the invention. It will, however, be noted that the precision of the means for setting the preload on the piezoelectric washer which are proposed by the present invention makes it possible, if necessary, to dispense with such a washer.

What is claimed is:

1. An accelerometer sensor, comprising:
   a cylindrical base formed with an annular shoulder and an axial barrel projecting from said annular shoulder, said cylindrical base having an axial hole formed through said it axial barrel and said annular shoulder;
   a washer of piezoelectric material slipped over said barrel, said washer being formed with two radial faces;
   a voltage pickup for picking off an electrical voltage between said radial faces of said washer;
   an annular mass slipped over said barrel; and
   said barrel being formed with a retaining bulge collaborating with said annular shoulder to trap said washer and said mass therebetween, said bulge protruding radially from said barrel and being a portion of said barrel deformed by an axial force for crushing said base.

2. The sensor according to claim 1, wherein said bulge is formed in a portion of said barrel formed with a relatively thinner wall.

3. The sensor according to claim 1, wherein said portion of said barrel is pierced with a plurality of apertures and said bulge is formed in said portion pierced with apertures.

4. The sensor according to claim 1, wherein said barrel has a wall of substantially constant thickness and said portion of said barrel at which said bulge is formed is disposed distally from said annular shoulder, whereby said piezoelectric washer and said mass are pinched between said bulge and said shoulder.

5. The sensor according to claim 1, wherein said bulge is a continuous annular bulge.

6. The sensor according to claim 3, wherein said bulge is a discontinuous annular bulge.

* * * * *